United States Patent
Cavataio et al.

(10) Patent No.: US 10,926,240 B2
(45) Date of Patent: *Feb. 23, 2021

(54) HYDROCARBON TRAP WITH INCREASED ZEOLITE LOADING AND IMPROVED ADSORPTION CAPACITY

(71) Applicant: Ford Global Technologies, LLC, Dearborn, MI (US)

(72) Inventors: Giovanni Cavataio, Dearborn, MI (US); Jason Aaron Lupescu, Wayne, MI (US); Manish Sharma, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/254,807

(22) Filed: Sep. 1, 2016

(65) Prior Publication Data
US 2016/0367963 A1 Dec. 22, 2016

Related U.S. Application Data

(62) Division of application No. 14/167,306, filed on Jan. 29, 2014, now Pat. No. 9,463,447.

(51) Int. Cl.
| | |
|---|---|
| *B01J 20/18* | (2006.01) |
| *B01J 37/02* | (2006.01) |
| *B01J 29/14* | (2006.01) |
| *B01J 29/24* | (2006.01) |
| *B01J 29/46* | (2006.01) |
| *B01J 29/63* | (2006.01) |
| *B01J 29/68* | (2006.01) |
| *B01J 29/76* | (2006.01) |
| *B01J 35/04* | (2006.01) |
| *B01D 53/94* | (2006.01) |
| *C04B 38/00* | (2006.01) |
| *B01J 29/80* | (2006.01) |
| *B01J 20/28* | (2006.01) |
| *B01J 29/70* | (2006.01) |
| *B01J 29/74* | (2006.01) |
| *C04B 111/00* | (2006.01) |

(52) U.S. Cl.
CPC ............. *B01J 20/18* (2013.01); *B01D 53/94* (2013.01); *B01D 53/945* (2013.01); *B01J 20/28045* (2013.01); *B01J 29/146* (2013.01); *B01J 29/24* (2013.01); *B01J 29/46* (2013.01); *B01J 29/63* (2013.01); *B01J 29/68* (2013.01); *B01J 29/7057* (2013.01); *B01J 29/7415* (2013.01); *B01J 29/76* (2013.01); *B01J 29/763* (2013.01); *B01J 29/7615* (2013.01); *B01J 29/80* (2013.01); *B01J 35/04* (2013.01); *B01J 37/0215* (2013.01); *B01J 37/0242* (2013.01); *B01J 37/0244* (2013.01); *B01J 37/0246* (2013.01); *B01J 37/0248* (2013.01); *C04B 38/0009* (2013.01); *B01D 2255/1021* (2013.01); *B01D 2255/1023* (2013.01); *B01D 2255/1025* (2013.01); *B01D 2255/20753* (2013.01); *B01D 2255/20761* (2013.01); *B01D 2255/502* (2013.01); *B01D 2255/908* (2013.01); *B01D 2255/9022* (2013.01); *B01D 2255/912* (2013.01); *B01D 2255/9155* (2013.01); *B01J 2229/186* (2013.01); *B01J 2229/42* (2013.01); *C04B 2111/0081* (2013.01); *Y02A 50/20* (2018.01); *Y02T 10/12* (2013.01)

(58) Field of Classification Search
None
See application file for complete search history.

(56) References Cited

U.S. PATENT DOCUMENTS

| | | | |
|---|---|---|---|
| 5,716,899 A | 2/1998 | Guile et al. | |
| 5,772,972 A * | 6/1998 | Hepburn | B01D 53/945 422/171 |
| 6,074,973 A * | 6/2000 | Lampert | B01D 53/945 423/213.2 |
| 6,087,298 A * | 7/2000 | Sung | B01D 53/945 502/333 |

(Continued)

FOREIGN PATENT DOCUMENTS

| | | | |
|---|---|---|---|
| CN | 101653730 | * | 2/2010 |
| CN | 101674877 A | | 3/2010 |

(Continued)

OTHER PUBLICATIONS

China national Intellectual Property Administration, Office Action and Search Report Issued in Application No. 201510043488.0, dated Jun. 2, 2020, 9 pages. (Submitted with Partial Translation).

(Continued)

*Primary Examiner* — Sheng H Davis
(74) *Attorney, Agent, or Firm* — Geoffrey Brumbaugh; McCoy Russell LLP

(57) ABSTRACT

A hydrocarbon trap is provided for reducing cold-start hydrocarbon emissions. The trap comprises a monolithic flow-through substrate having a porosity of at least 60% and including a zeolite loading of at least 4 g/in³ in or on its walls. A separate coating of a three-way catalyst is provided over the zeolite coating. The trap may further include an oxygen storage material. The hydrocarbon trap may be positioned in the exhaust gas system of a vehicle such that unburnt hydrocarbons are adsorbed on the trap and stored until the monolith reaches a sufficient temperature for catalyst activation.

19 Claims, 7 Drawing Sheets

(56) References Cited

U.S. PATENT DOCUMENTS

| | | | |
|---|---|---|---|
| 6,667,018 B2 | 12/2003 | Noda et al. | |
| 6,869,573 B2 | 3/2005 | Abe et al. | |
| 8,080,211 B2 * | 12/2011 | Ogyu | B01D 46/2429 422/180 |
| 8,246,922 B2 | 8/2012 | Boorse et al. | |
| 8,318,286 B2 | 11/2012 | Patchett et al. | |
| 8,377,370 B2 | 2/2013 | Merkel | |
| 9,091,197 B2 * | 7/2015 | Hirose | B01D 46/2425 |
| 2004/0001781 A1 | 1/2004 | Kumar et al. | |
| 2004/0223897 A1 * | 11/2004 | Yeo | B01D 53/945 423/213.5 |
| 2006/0229476 A1 * | 10/2006 | Mitchell | B01J 21/18 568/959 |
| 2007/0238606 A1 * | 10/2007 | Han | B01D 53/945 502/60 |
| 2010/0011746 A1 * | 1/2010 | Lupescu | F02M 25/12 60/278 |
| 2011/0030346 A1 | 2/2011 | Neubauer et al. | |
| 2011/0085941 A1 | 4/2011 | Ogyu et al. | |
| 2012/0023909 A1 * | 2/2012 | Lambert | F01N 3/0842 60/274 |
| 2012/0064286 A1 | 3/2012 | Hirose et al. | |
| 2012/0079817 A1 * | 4/2012 | Wei | B01D 53/944 60/299 |
| 2012/0216508 A1 * | 8/2012 | Collins | F01N 3/0807 60/274 |
| 2013/0004391 A1 | 1/2013 | Pfeifer et al. | |
| 2013/0071608 A1 * | 3/2013 | Suenobu | B01D 46/2429 428/116 |
| 2013/0089483 A1 * | 4/2013 | Stiebels | B01J 29/04 423/239.2 |
| 2013/0202495 A1 * | 8/2013 | Lupescu | F01N 3/0807 422/177 |
| 2013/0287659 A1 * | 10/2013 | Lupescu | B01J 37/0246 423/213.5 |
| 2014/0044625 A1 * | 2/2014 | Lupescu | F01N 3/0814 423/212 |
| 2014/0186227 A1 * | 7/2014 | Yoon | F01N 3/101 422/171 |

FOREIGN PATENT DOCUMENTS

| | | |
|---|---|---|
| CN | 103375231 A | 10/2013 |
| EP | 0090579 A2 | 3/1983 |
| EP | 0639400 A1 | 7/1994 |
| GB | 0915326 * | 10/2009 |

OTHER PUBLICATIONS

State Intellectual Property Office of the People's Republic of China, Office Action Issued in Application No. 201510043488.0, dated Jun. 7, 2018, 7 pages. (Submitted with Partial Translation).

* cited by examiner

HYDROCARBON TRAP WITH INCREASED ZEOLITE LOADING AND IMPROVED ADSORPTION CAPACITY

CROSS REFERENCE TO RELATED APPLICATIONS

The present application is a divisional of U.S. patent application Ser. No. 14/167,306, entitled "HYDROCARBON TRAP WITH INCREASED ZEOLITE LOADING AND IMPROVED ADSORPTION CAPACITY," filed on Jan. 29, 2014 the entire contents of which are incorporated herein by reference for all purposes.

BACKGROUND OF THE INVENTION

Embodiments described herein relate to a hydrocarbon trap having improved adsorption of emissions, and more particularly, to a hydrocarbon trap including a high porosity carrier material in the form of a flow-through substrate which allows a large loading of zeolite to provide improved adsorption of hydrocarbons.

In recent years, considerable efforts have been made to reduce the level of hydrocarbon (HC) emissions from vehicle engines. Conventional exhaust treatment catalysts such as three-way catalysts achieve conversion of hydrocarbons to water and help prevent the exit of unburnt or partially burnt hydrocarbon emissions from a vehicle. However, hydrocarbon emissions are high during cold starting of the engine before the latent heat of the exhaust gas heats the catalyst and allows it to become active, i.e., before the catalyst has reached its "light-off" temperature.

Hydrocarbon traps have been developed for reducing emissions during cold-start by trapping/adsorbing hydrocarbon (HC) emissions at low temperatures and releasing/desorbing them from the trap at sufficiently elevated temperatures for oxidation over a catalyst, such as a three-way catalyst. The HC traps are positioned in the exhaust gas stream of a vehicle. Currently, zeolites have been the most widely used adsorption materials for hydrocarbon traps. The zeolites are typically combined with a three-way catalyst in the form of a washcoat which is supported on a monolithic substrate.

While increasing the zeolite washcoat loading typically provides improved conversion efficiency, there is a limit to how much the total washcoat loading can be increased without experiencing decreased conversion efficiency and an undesirable increase in backpressure in the HC trap.

It would be desirable to improve the overall HC trap function by maximizing hydrocarbon adsorption capacity during cold starts and minimizing the desorption rate of hydrocarbons from the trap until the catalyst has reached its "light off" temperature.

SUMMARY OF THE INVENTION

Embodiments of the invention provide a hydrocarbon trap which utilizes a high porosity carrier material in the form of a flow-through monolithic substrate to allow a high loading of zeolite. The substrate also includes a three-way catalyst thereon to convert hydrocarbon emissions. By utilizing a high porosity carrier material, the zeolite loading on the substrate can be increased without an undesirable increase in backpressure, resulting in improved conversion efficiency.

The trap uses a wall flow substrate in which the alternating plugs have been removed to form a flow-through substrate which has increased porosity, and the ability to increase zeolite loading on the substrate. Thus, the flow-through monolithic substrate differs from conventional flow-through monoliths which, while not including plugs, are not highly porous.

According to one aspect of the invention, a hydrocarbon trap for reducing vehicle exhaust emissions is provided which comprises a monolithic flow-through substrate having a porosity of at least 60% and including a loading of at least 4 $g/in^3$ zeolite in or on the substrate. In one embodiment, the hydrocarbon trap has a porosity of at least 65%. Porosity is a measure of the open or void space in a material and is expressed as the ratio of the void volume to bulk volume of a material.

In one embodiment, the hydrocarbon trap includes a zeolite loading of at least 5 $g/in^3$ in or on the substrate. In another embodiment, the hydrocarbon trap has a zeolite loading of from about 5.0 to about 8.0 $g/in^3$. The zeolite in the substrate preferably has a $Si/Al_2$ ratio of from about 20 to about 500. The zeolite is selected from zeolites having the structure BEA, FAU, MOR, MFI, FER, CHA, LTL, LTA, or mixtures thereof. Preferably, the zeolite comprises beta zeolite.

In one embodiment, the hydrocarbon trap further includes a three-way catalyst over the zeolite. The trap may include a loading of about 2 $g/in^3$ of the three-way catalyst. The three-way catalyst preferably comprises a precious metal selected from the group consisting of platinum, palladium, rhodium, and mixtures thereof.

The monolithic flow-through substrate is preferably selected from the group consisting of cordierite, silicon carbide, and mullite. By "flow-through substrate," it is meant that the monolith includes no plugs such that gas readily flows through the monolith channels rather than being forced to flow through the porous walls of the channels. The flow-through substrate preferably has a wall thickness of about 5 to 20 mils, and a cell density of about 300 to 900 cells per square inch (cpsi).

Preferably, the monolithic flow-through substrate has an open frontal area (OFA) of about 60 to 80%. By "open frontal area", or OFA, it is meant the part of the total substrate cross-sectional area which is available for the flow of gas. The OFA is expressed as a percentage of the total substrate cross-section or substrate void fraction.

In one embodiment, the trap further includes a catalyst comprising a mixture of nickel and copper in or on the flow-through substrate.

The hydrocarbon trap may further include an oxygen storage capacity (OSC) material to provide additional oxygen needed for the oxidation of hydrocarbons. The oxygen storage capacity material may be selected from ceria-zirconia, ceria-praesodymium, or mixtures thereof. Base metal oxides such as Ni—Cu (NiO—CuO) and $MnO_2$ may also be used as oxygen storage materials. Preferably, the OSC material is impregnated with a base metal or precious metal and is included in the zeolite washcoat slurry.

In another embodiment of the invention, a method of forming a hydrocarbon trap for use in an exhaust treatment system is provided which comprises providing a monolithic flow-through substrate having a porosity of at least 60%; providing a slurry of a hydrocarbon trapping material comprising zeolite; and coating the slurry into and/or on the monolithic substrate such that the zeolite loading is at least 4 $g/in^3$. The method may include coating a slurry containing a three-way catalyst over the zeolite coating. The method may further include coating a slurry containing an oxygen storage capacity material in or on the substrate.

As exhaust gases pass through the exhaust system of a vehicle, the hydrocarbon trap provides improved adsorption of unburned hydrocarbon emissions and retains the hydrocarbons until the exhaust gases heat the trap to a sufficient temperature for catalytic conversion, i.e., about 200° C. to 400° C., at which time the hydrocarbons are desorbed and are oxidized by the three-way catalyst in the trap. The trap is positioned in the exhaust gas system of a vehicle such that gases pass through the trap at a gas space velocity of 30,000/hr and the trap adsorbs and retains from about 50 to 90 wt. % of the unburned hydrocarbons in the exhaust gas at a temperature between about −40 and about 200° C.

Accordingly, it is a feature of embodiments of the invention to provide a hydrocarbon trap for reducing cold start vehicle exhaust emissions. Other features and advantages of the invention will be apparent from the following description, the accompanying drawings, and the appended claims.

DETAILED DESCRIPTION

Figure 1:
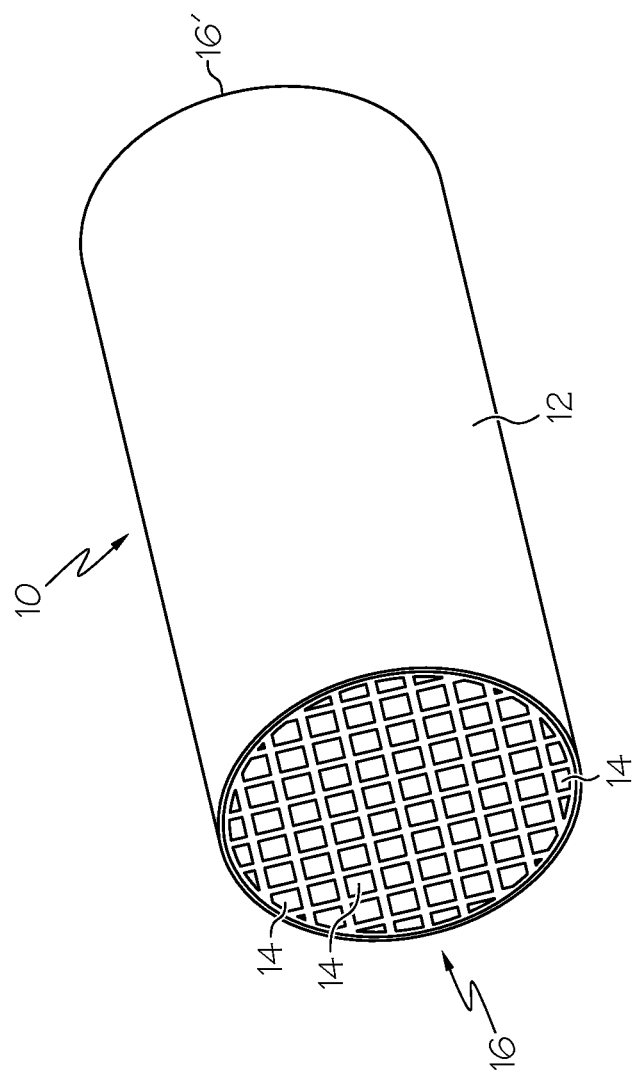
FIG. 1 is a schematic illustration of a hydrocarbon trap in accordance with an embodiment of the invention.

Embodiments of the hydrocarbon trap described herein utilize a monolithic flow-through substrate having a high porosity to allow an increased loading of zeolite therein. The high porosity monolithic flow-through substrate differs from conventional wall-flow substrates such as those used to trap gas particulates in that it does not include alternating cell plugs which forces gas to flow through porous cell walls. Rather, it acts as a flow-through substrate in which gases flow directly along the channels formed by the cell walls. By using a substrate having no alternating plugs, the interior porous wall volume may be at least partially filled with zeolite. In addition, because the substrate includes no plugs, exhaust gas is not forced to flow through the walls and flows easily through the monolith channels.

Thus, the use of a high porosity substrate which has no plugs allows a higher loading of zeolite to be included without an undesirable increase in backpressure, i.e., more zeolite capacity per unit volume is achieved. Further, this higher effective loading is achieved without having to use an extrusion technique such as that described in commonly-assigned application Ser. No. 13/569,472, the entire subject matter of which is incorporated herein by reference. The monolithic substrate provides a further advantage over extruded zeolite monoliths in that separate washcoat layers may be applied to provide strategic placement of the coatings. For example, one or more coatings may be applied so that the zeolite becomes impregnated in the porous walls followed by forming a coating on the walls to achieve the desired loading. In addition, the use of a high porosity wall-flow substrate allows the use of metals (such as cesium, potassium, copper, silver, nickel, iron, or mixtures thereof) to enhance HC adsorption or oxidation without the problem of metal ion migration out of the zeolite as such metals may be initially impregnated into the high porosity substrate prior to application of the additional washcoats.

Embodiments of the invention also provide an improvement over the use of prior zeolite washcoated cordierite monoliths, which suffer from the problem of increased backpressure when zeolite loading is increased. For example, typical backpressure limitations for coating a cordierite monolith permit no more than 5 to 6 $g/in^3$ of slurry (i.e., 3 to 5 $g/in^3$ zeolite plus 1 to 2 $g/in^3$ of a three-way catalyst layer). By utilizing a high porosity flow-through substrate, a higher content of zeolite can be incorporated in the hydrocarbon trap beyond these washcoat limits.

Unless otherwise indicated, the disclosure of any ranges in the specification and claims are to be understood as including the range itself and also anything subsumed therein, as well as endpoints.

Suitable high porosity flow-through substrates for use include cordierite, silicon carbide, and mullite. Preferred for use is cordierite or silicon carbide. Commercially available particulate filters may be used as long as they have been modified to remove any alternating plugs. It is also possible to use a metal mesh or porous metallic substrate which is capable of holding a washcoat. The substrate preferably has a porosity from about 60 to 90% with sufficient pore size (over 20 microns) to allow the zeolite washcoat slurry to become impregnated into the substrate walls and optionally adhere onto the walls. More preferably, the substrate has a porosity of at least 65%.

Suitable zeolite materials for use in the trap include beta (BEA) zeolite, FAU, MOR, MFI, FER, CHA, LTL, and LTA zeolites. Examples of suitable beta-zeolite materials include H-beta-40, H-beta-25, ZSM-5 zeolite, or mixtures thereof.

Beta-zeolite materials are preferred for use as they have a larger average pore size of about 5.6 to 7.5 Å in diameter and thus a larger pore volume than other types of zeolites for enhanced hydrocarbon molecule trapping. In addition, beta-zeolites have a pore tunnel structure running through the crystal in all three axis directions, allowing good transport of molecules in and out, and providing consistent zeolite-to-molecule contact. The zeolite preferably has a $Si/Al_2$ ratio of from about 20 to about 500, and more preferably, from about 20 to 100.

Suitable binder materials for use with the zeolite include alumina, ceria, zirconia, or ceria-zirconia, refractory metals, or mixtures thereof. Other conventional binder materials may also be used.

The zeolite material(s) may be mixed with the binder material and water to form a washcoat slurry for coating in/on the substrate. The zeolite is preferably contained in the slurry at an amount of about 60 to 80% by weight solids, and the binder comprises about 20% to 40% by weight of the slurry. More preferably, the solids content of the slurry contains about 80% by weight zeolite and 20% by weight binder.

A three-way catalyst material is preferably coated over the zeolite washcoat at about 30 to 70% by weight solids to a loading of from about 1 to about 2 $g/in^3$. Preferred three-way catalyst metals include platinum, palladium, rhodium, and mixtures thereof.

An oxygen storage capacity (OSC) material may also be included in the zeolite washcoat slurry in an amount of about 10% by weight solids or less, and more preferably, about 5% by weight solids or less. Suitable OSC materials include ceria-zirconia (CZO) and ceria-praesodymium, or base metals such as NiO—CuO and $MnO_2$.

The hydrocarbon trap may further optionally contain nickel and copper base metals as disclosed in commonly-assigned US 20130287659, the entire subject matter of which is incorporated herein by reference. The addition of the nickel-copper catalyst helps retain stored alkene and aromatic hydrocarbons at higher temperatures than without the catalyst. For example, the nickel and copper metals may be impregnated into the monolith substrate prior to adding the zeolite washcoat. The metals may optionally be calcined at a sufficient temperature to react with the substrate and stay in place. Alternatively, copper-ion exchanged zeolites may be used along with the addition of nickel by impregnation. The nickel metal provides oxygen storage capacity and enables coke oxidation. The nickel and copper may also be impregnated onto gamma alumina particles followed by calcining at a temperature sufficient to allow the metals to react with alumina and stay in place, followed by mixing the metals into the zeolite slurry for coating onto the monolith. Preferably, when added, the Ni—Cu catalyst is added at a ratio of about 9:1 with the wt % of copper below half the theoretical exchange limit of the zeolite.

The zeolite washcoat is preferably applied in one or more coats to achieve a target loading of 5 $g/in^3$ (up to about 3 $g/in^3$ per pass). In some instances, it has been found that in the first coating, the washcoat become impregnated into the walls of the substrate, while in additional coating(s), the washcoat becomes coated on the surface of the walls. After application of the zeolite washcoat to the monolith substrate, the coating is then allowed to harden/dry at a temperature of about 500° C. for about two hours. The resulting zeolite monolith preferably has an open frontal area (OFA) of between about 40 and 60%. This allows a zeolite loading greater than or equal to 5 $g/in^3$, which allows about 2 $g/in^3$ of the three-way catalyst to be included without increasing backpressure to undesirable levels. Preferably, the hydrocarbon trap preferably has a zeolite content of from about 5.0 to about 8.0 $g/in^3$. In addition, we have found that at least 2 $g/in^3$ of the zeolite slurry penetrates into the porous walls of the monolith substrate. The use of a lower open frontal area and thick monolith walls increases diffusional resistance to the desorbing HC molecules at high temperature, which also provides an advantage over prior monolith structures.

The flow-through substrate preferably has a wall thickness of about 5 to 20 mils, and more preferably, about 10 mils. The flow-throw substrate has a cell density of about 300 to 900 cells per square inch (cpsi), and more preferably, about 400 cpsi. It should be appreciated that the relationship between OFA, cell density, and wall thickness is important. For example, increasing the wall thickness of a fixed cpsi will decrease the OFA and increase zeolite content, but will increase backpressure across the monolith. Similarly, decreasing the cpsi for a monolith having a fixed wall thickness will alleviate backpressure but will decrease mass transfer of inlet HC emissions into the monolith walls. Combinations of open frontal area, cell density, and wall thicknesses in embodiments of the present invention limit undesirable increases in backpressure while enhancing hydrocarbon adsorption.

In embodiments where the three-way catalyst material is coated over the zeolite, the catalyst may be applied by washcoating. For example, the three-way catalyst may be coated on the surface of the zeolite coated monolith substrate by conventional techniques known in the art. The use of a separate TWC washcoat layer over the zeolite layer provides a barrier between the platinum group metal in the TWC and the zeolite while providing direct contact between the platinum group metal and OSC material.

Referring now to FIG. 1, a hydrocarbon trap 10 is illustrated in accordance with an embodiment of the invention. As shown, the trap comprises a zeolite-coated monolith and includes an outer surface 12 and a plurality of generally parallel gas flow channels or cells 14 extending from the inlet face 16 through outlet face 16'. While square cells are illustrated, it is within the scope of the invention to have hexagonally-shaped cells or other geometric shapes.

Figure 2:
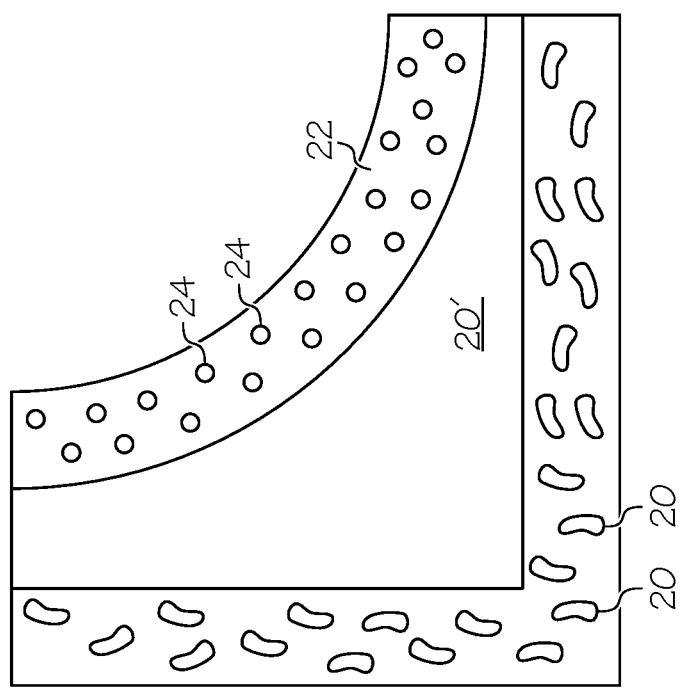
FIG. 2 is an enlarged partial cross-sectional view of one cell of the hydrocarbon trap of FIG. 1.
Figure 3:
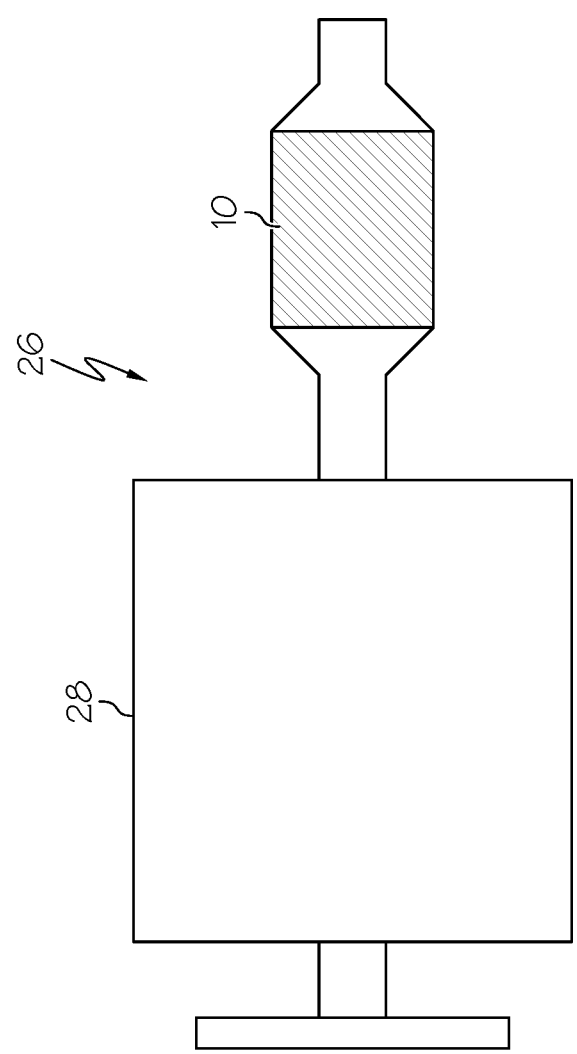
FIG. 3 is a schematic illustration of an exhaust treatment system including a hydrocarbon trap in accordance with an embodiment of the invention.

An enlarged view of a partial single cell 14 of the monolith structure is illustrated in FIG. 2. The structure shown in FIG. 2 includes the hardened zeolite material 20 impregnated in the walls of the substrate as well as a coating of zeolite 20' on the surface of the substrate walls. The structure further shows a three-way catalyst coating 22 over the zeolite coating. An OSC material 24 may also be present in the zeolite monolith in contact with the three-way catalyst. Referring now to FIG. 3, an exhaust treatment system 26 is shown and includes hydrocarbon trap 10 in an underbody location of the vehicle. As shown, the exhaust treatment system is coupled to an exhaust manifold 28 of an engine (not shown). The system may include additional catalysts or filters (not shown) in addition to the hydrocarbon trap.

During operation, as exhaust gas generated by the engine passes through the hydrocarbon trap 10, cold-start emissions of ethanol and unburnt hydrocarbons such as propylene and toluene are adsorbed by the zeolite and stored in the trap. Absorbed ethanol and hydrocarbons will not be released until the engine and the exhaust therefrom reach sufficiently elevated temperatures to cause desorption. Preferably, substantial desorption of the trapped emissions is delayed until the three-way catalyst reaches its light-off temperature. The desorbed molecules are then oxidized to $CO_2$ and $H_2O$ by the three-way catalyst. In embodiments where the trap includes an OSC material, the OSC material supplies oxygen for the catalyzed oxidation reaction.

In order that the invention may be more readily understood, reference is made to the following examples, which are intended to illustrate the invention, but are not to be taken as limiting the scope thereof.

EXAMPLE 1

Hydrocarbon traps were prepared in accordance with embodiments of the invention utilizing a high porosity carrier comprising cordierite having 65% porosity. The first sample utilized a carrier having a wall thickness of 12 mil and a cell density of 300 cpsi. The second sample utilized a carrier having a wall thickness of 5 mil and a cell density of 400 cpsi. The zeolite coating comprised a BEA zeolite with a conventional washcoat binder. The samples were coated with one or more coats using a conventional coating process.

A comparative sample was prepared from a standard porosity cordierite substrate having a porosity of 35%, a wall thickness of 6 mil and a cell density of 400 cpsi. A second comparative sample was prepared from a standard porosity cordierite substrate having a porosity of 35%, a wall thickness of 4 mil and a cell density of 400 cpsi. The samples were coated using a conventional coating process.

The resulting zeolite content of the coated substrates (based on the dry core mass) is shown below in Table 1. By "dry core mass," it is meant the mass of the core of the coated brick (i.e., a 11/16 inch diameter by 1 inch long core (0.37 $in^3$) which has been removed from the brick in addition to a 1/16 hole drilled through the axial center for a thermocouple) after a degas procedure in which the core is heated to 350° C. under vacuum for 2 hours to remove any water.

TABLE 1

| Zeolite content (g/in$^3$) | Substrate (cell density/wall thickness) | Dry Core Mass (g) |
|---|---|---|
| 4.0 | High porosity 300/12 | 3.7 |
| 5.7 | High porosity 400/5 | 3.0 |
| 2.7 | Standard porosity 400/4 | 2.7 |
| 4.7 | Standard porosity 400/4 | 3.5 |
| 4.3 | Standard porosity 400/6 | 3.4 |

The 300/12 high porosity substrate had a zeolite content of about 1.8 g/in$^3$ in the substrate walls and about 2.2 g/in$^3$ on the walls, while the 400/5 high porosity substrate had a zeolite content of about 2.0 g/in$^3$ in the walls and about 3.7 g/in$^3$ on the walls. The amount of zeolite in the walls was estimated based on the load of the first zeolite coat of 2.5 to 3.0 g/in$^3$ and the microscopy images observed after coating.

The various traps were tested for hydrocarbon adsorption and desorption using various blends of synthetic hydrocarbons to simulate exhaust emissions (3-part HC blend and 5-part HC blend). The 3-part HC blend comprised 0.15% of the feed and included (by volume %) 59% propylene, 23% isopentane, and 18% toluene. The 5-part HC blend comprised 0.18% of the feed and included (by volume %) 40% propylene, 27% ethanol, 5% acetaldehyde, 16% isopentane and 12% toluene. The exhaust flow was established in bypass relative to a sample for a downstream measurement of inlet species, and then switched by a solenoid valve such that the feed was sent from a bypass to the sample followed by another bypass.

The testing conditions included preconditioning of the samples at 600° C. in 2% oxygen and the balance nitrogen, followed by a cooldown to 30° C. in nitrogen. The respective samples were exposed to one of two types of hydrocarbon blends with 0.2% carbon monoxide, 0.08% hydrogen, and 10% water vapor in air for 30 seconds at 30° C. After 30 seconds, the feed was sent back to bypass. The hydrocarbons were removed from the feed stream and the feed was changed to 10% water and the balance nitrogen ($\lambda$=1.000). The feed was then sent back to the sample while the oven was ramped to 600° C. at 80° C./min. for a downstream measurement of stored species desorption quantity as a function of sample temperature.

The following aging conditions were used:
A sample oven was maintained at 760° C. for 50 hours. The following four modes were used to control oxygen and provide a cyclical temperature of 740° C. to 840° C. at the zeolite midbed throughout the aging duration:
1) stoichiometric combustion ($\lambda$=1.000)
2) Rich combustion ($\lambda$=0.92)
3) Rich combustion with secondary air ($\lambda$=1.1)
4) Stoichiometric combustion with secondary air ($\lambda$=1.3)

Figure 4A:
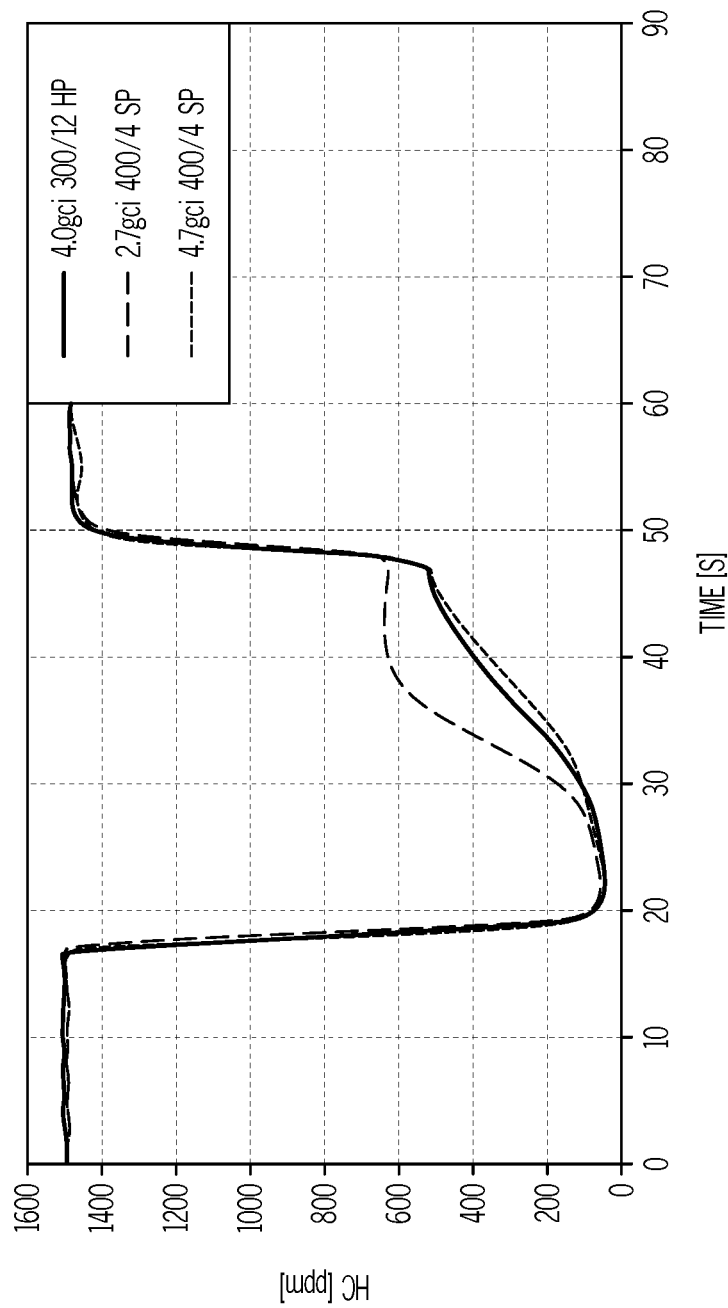
FIGS. 4A and 4B are graphs illustrating the hydrocarbon adsorption and desorption of a hydrocarbon trap comprising a high porosity substrate in comparison with a trap comprising a standard porosity substrate.
Figure 4B:
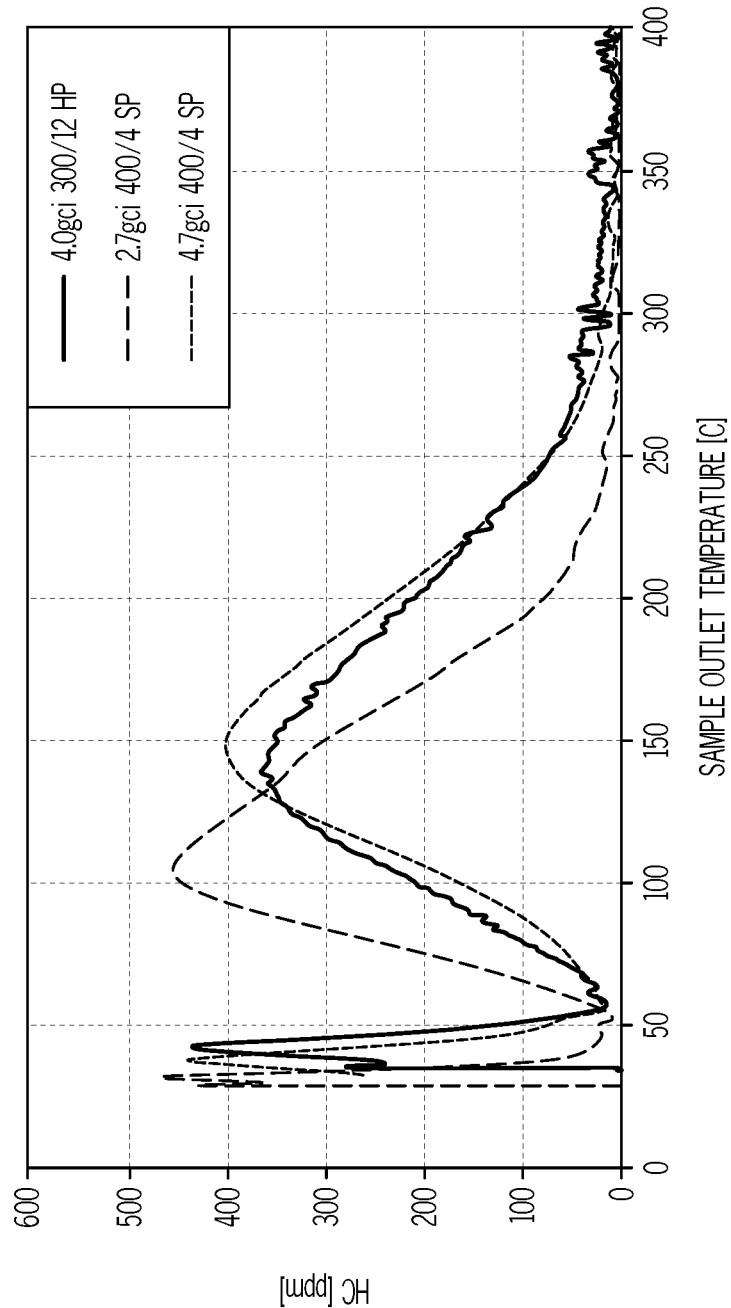
Figure 5A:
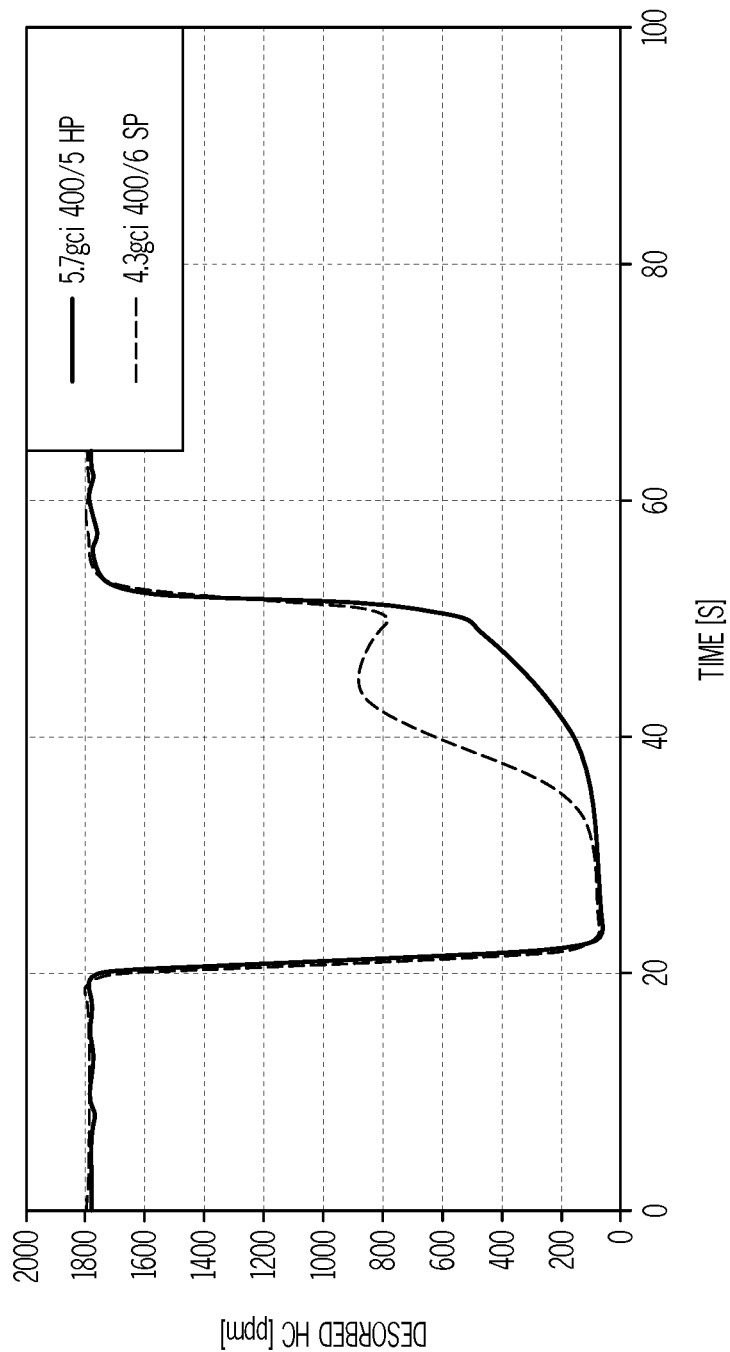
FIGS. 5A and 5B are graphs illustrating the hydrocarbon adsorption and desorption of a hydrocarbon trap comprising a high porosity substrate in comparison with a trap comprising a standard porosity substrate.
Figure 5B:
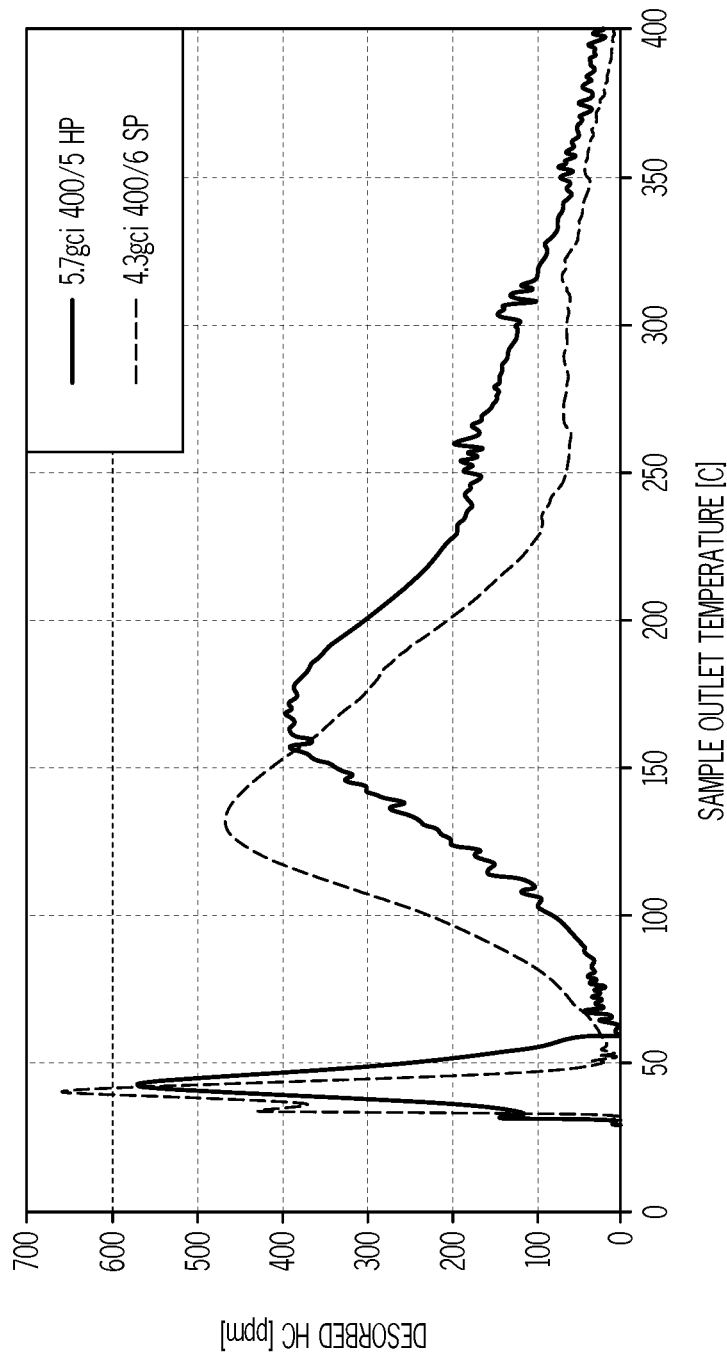

A thermocouple and an FID analyzer were used to calculate the adsorption/desorption. FIGS. 4A and 4B illustrate the adsorption and desorption performance using a 3-part hydrocarbon blend, and FIGS. 5A and 5B illustrate the adsorption and desorption performance of the 5-part blend. As can be seen, the high porosity coated substrates show improved performance over the use of standard porosity coated samples. While not wishing to be bound by theory, it is believed that this can be attributed to the presence of zeolite within the substrate walls as well as on the walls.

Having described the invention in detail and by reference to preferred embodiments thereof, it will be apparent that modifications and variations are possible without departing from the scope of the invention.

What is claimed is:

1. A hydrocarbon trap for reducing cold-start vehicle exhaust emissions comprising:
   a monolithic flow-through substrate having a porosity of at least 60% and including a washcoating of zeolite at a loading of at least 5 g/in$^3$ zeolite in and/or on said substrate, wherein said washcoating of zeolite is impregnated into porous walls of said substrate and coated onto said porous walls of said substrate, wherein said hydrocarbon trap includes a catalyst comprising a mixture of nickel and copper in or on said substrate and further includes a three-way catalyst coated over said zeolite coated porous walls.

2. The hydrocarbon trap of claim 1, wherein said substrate has a porosity of at least 65%, and wherein at least 2 g/in$^3$ of the washcoating of the zeolite penetrates into said porous walls of the substrate.

3. The hydrocarbon trap of claim 1, wherein said substrate does not include cell plugs.

4. The hydrocarbon trap of claim 1, wherein said substrate is selected from the group consisting of cordierite, silicon carbide, and mullite.

5. The hydrocarbon trap of claim 1, wherein said zeolite has a Si/Al$_2$ ratio of from about 20 to about 500.

6. The hydrocarbon trap of claim 1, wherein said zeolite is selected from zeolites having the structure BEA, FAU, MOR, MFI, FER, CHA, LTL, LTA, or mixtures thereof.

7. The hydrocarbon trap of claim 1, further including an oxygen storage capacity material wherein said oxygen storage capacity material is ceria-praesodymium or mixtures thereof.

8. The hydrocarbon trap of claim 3, including a loading of about 2 g/in$^3$ of said three-way catalyst, and wherein said substrate has a pore size of over 20 microns.

9. The hydrocarbon trap of claim 3, wherein said three-way catalyst comprises a precious metal selected from the group consisting of platinum, palladium, rhodium, and mixtures thereof.

10. The hydrocarbon trap of claim 8, wherein said substrate has a wall thickness of about 5 to 20 mils.

11. The hydrocarbon trap of claim 10, wherein said substrate has a cell density of about 300 to 900 cells per square inch (cpsi).

12. The hydrocarbon trap of claim 11, wherein said monolithic substrate has an open frontal area (OFA) of about 60 to 80%.

13. A method of forming a hydrocarbon trap for use in an exhaust treatment system of a vehicle, comprising:
   providing a monolithic wall-flow substrate having a porosity of at least 60%;
   providing a slurry of a hydrocarbon trapping material comprising zeolite;
   coating said slurry into and/or on said monolithic substrate such that a washcoated zeolite loading of the substrate is at least 5 g/in$^3$, including applying two or more coats of said slurry into and/or on said monolithic substrate so that said zeolite coats porous walls of said monolithic substrate and at least 2 g/in$^3$ of the zeolite penetrates into said porous walls of the monolithic substrate such that a porous wall volume of said porous walls is at least partially filled with said zeolite; and
   coating a three-way catalyst over said zeolite coating.

14. The method of claim 13, wherein said monolithic substrate includes a mixture of nickel and copper, the mixture of nickel and copper calcined at a temperature to react with the monolithic substrate, the mixture of nickel and copper impregnated into the monolithic substrate prior to said coating of said slurry.

15. The method of claim 13, wherein said monolithic substrate has an open frontal area (OFA) of about 60 to 80%.

16. The method of claim 13, wherein providing said slurry of said hydrocarbon trapping material comprising zeolite comprises providing a slurry comprising solids in water, the solids including about 80% by weight zeolite and 20% by weight binder.

17. The method of claim 14, wherein the slurry includes an oxygen storage capacity material.

18. An exhaust treatment system comprising the hydrocarbon trap of claim 1 positioned in an exhaust passage of a vehicle.

19. A hydrocarbon trap for reducing cold-start vehicle exhaust emissions comprising:
   a monolithic flow-through substrate consisting of a) and b), where a) is cordierite, silicon carbide, or mullite; and b) is pores with a pore size of over 20 micron, the substrate having a porosity of at least 65%;
   a loading of at least 4 $g/in^3$ zeolite in and/or on the substrate, wherein the zeolite is impregnated into porous walls of the substrate and coated onto the porous walls of the substrate; and
   a three-way catalyst over the zeolite, the three-way catalyst loaded at a loading of about 2 $g/in^3$, and an open front area of the substrate loaded with the zeolite is between about 40 and 60%.

* * * * *